Sept. 1, 1925.
J. KENNEDY
1,551,958
DRIVING MECHANISM FOR ROLLING MILLS
Filed June 4, 1921
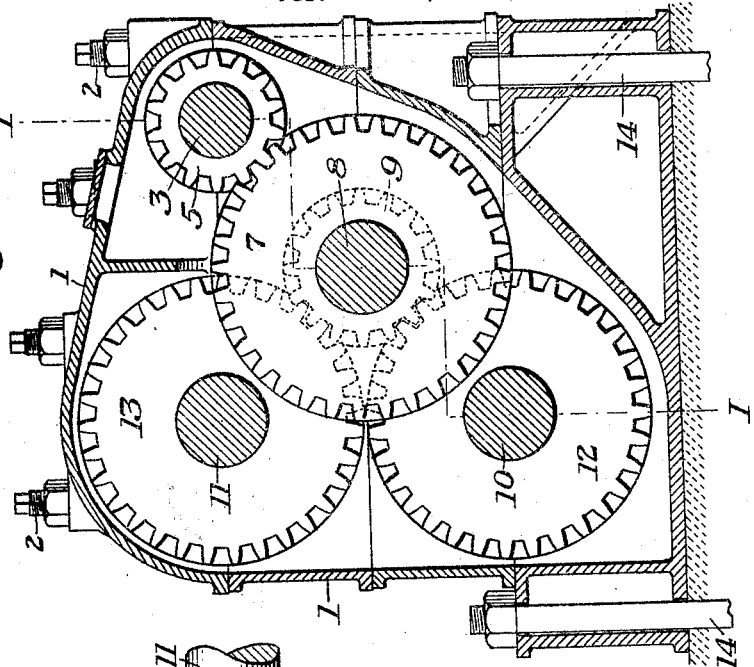
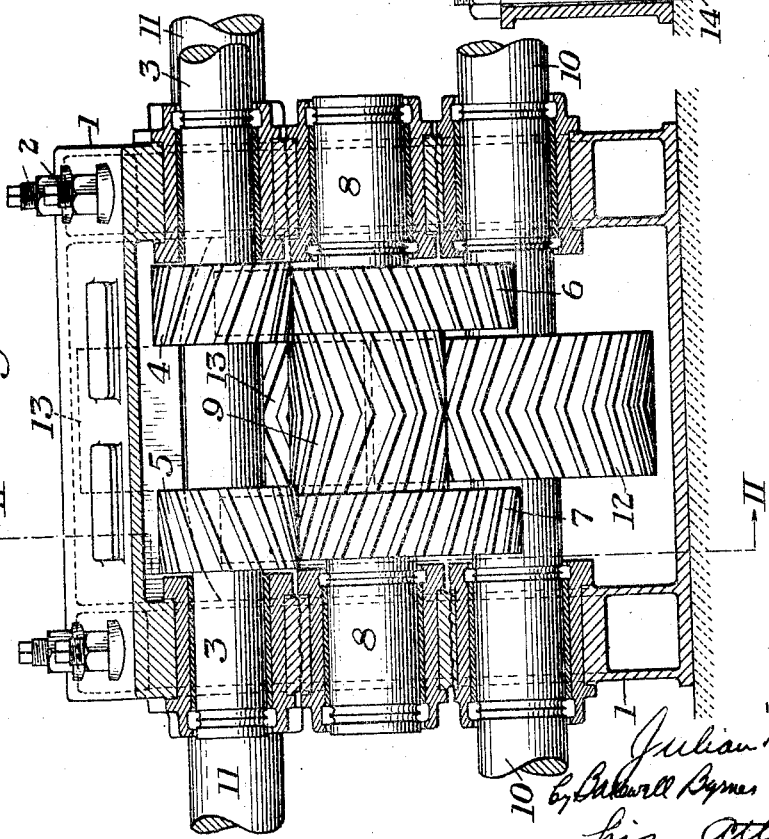
INVENTOR.
Julian Kennedy
by Bakewell Byrnes & Parmelee
his Attorneys Patented Sept. 1, 1925.

1,551,958

UNITED STATES PATENT OFFICE.

JULIAN KENNEDY, OF PITTSBURGH, PENNSYLVANIA.

DRIVING MECHANISM FOR ROLLING MILLS.

Application filed June 4, 1921. Serial No. 474,892.

*To all whom it may concern:*

Be it known that I, JULIAN KENNEDY, a citizen of the United States, residing at Pittsburgh, in the county of Allegheny and State of Pennsylvania, have invented a new and useful Improvement in Driving Mechanism for Rolling Mills, of which the following is a full, clear, and exact description.

My invention relates to driving mechanism for rolling mills, and is designed to efficiently transmit the large amount of power necessary in devices of this character. My invention is particularly applicable to three-high mills although not limited to use in that particular type of mill.

An object of my invention is a gear driving mechanism of the above character which is compact in form and which will transmit the necessary large amount of power efficiently.

Another object of my invention is such a device which is so designed as to eliminate end thrust on the shafts, and which also avoids unbalanced pressure on the shaft bearings.

Other objects of my invention will be apparent to those skilled in the art upon reading of the following description in connection with the accompanying drawings forming a part thereof and in which:

Figure 1 is an elevation of the gears with the casing in section on line I—I of Figure 2; and Figure 2 is a sectional elevation on line II—II of Figure 1.

Referring to the drawings, any suitable casing or housing 1 may enclose the gears. This housing is provided with bearings for the shafts, which may be of any suitable design and construction. The housing is of the sectional type and the sections are held together by any suitable means, such as bolts 2.

The primary power shaft 3 is operated by any suitable motor, not shown. This shaft carries split gears 4 and 5, which are provided with teeth of the herring-bone type. The gears 4 and 5 mesh with gears 6 and 7, respectively, which are carried on a jack shaft 8. The gears 6 and 7 are somewhat larger in diameter than the gears 4 and 5, for speed reducing purposes. Mounted on the jack shaft 8 is a double helical gear 9 of the herring-bone type. This gear is mounted between the gears 6 and 7 and is of less diameter than the gears 6 and 7. Mounted in the housing 1 are two roll shafts 10 and 11. Each of these shafts carries a gear which meshes with the gear 9. These shafts may be connected in any suitable manner with the upper and lower rolls of a three-high mill or other devices. The shaft 10 carries a gear 12, and the shaft 11 a gear 13. The gears 9, 12 and 13 are mounted in the same plane, and the gear 9 engages both gears 12 and 13.

The housing 1 is anchored in position by any suitable means, such as the anchor bolts 14.

From the foregoing, it will be seen that the gears on the roll shafts and the power gear which operates them directly, are in the same plane; and that the primary power shaft 3 transmits its power to the jack shaft 8 through the split gears located on opposite sides of the gear 9. The teeth on the gears 4 and 5 are oppositely disposed with respect to each other, as are the teeth on the gears 6 and 7. By reason of the split gears, one pair of which is placed on each side of the gear 9, the driving power will be equally applied on the two sides of the gear 9, thus eliminating any unbalanced pressure on the bearings of the shafts 3 or 8. Further, the arrangement of the teeth on the gears 4 and 5 avoids any resultant end thrust on the shafts 3 or 8, so that with the arrangement shown and described, the gears 4, 5, 6 and 7 exert substantially equal cumulative torsional stress on the shaft 8, and substantially equal and opposite end thrust on the shaft 8 and on each side of the power gear 9.

This arrangement results in an efficient driving mechanism for transmitting the large amount of power necessary in rolling mills, without the consequent wear and tear and the destruction of the gears and bearings. At the same time, the driving mechanism is compact in form and affords a substantial speed reduction with a minimum number of gear units.

My invention, therefore, has many advantages, chief among which are that unbalanced pressure on the bearings and end thrust are eliminated, and a device is provided which by reason of the absence of these factors is durable and efficient in operation.

I claim:

1. A drive for a rolling mill having two roll shafts, a double helical gear on each roll shaft, a jack shaft having an axis of rotation out of the plane containing the axes of the roll shafts, a double helical driving gear on the jack shaft meshing with the gears on the roll shafts, the three gears being in the same plane, two driving gears on the jack shaft, one on each side of the first driving gear, a power shaft, and two gears on the power shaft meshing with the gears on the jack shaft, said driving shaft being located on the opposite side of the jack shaft from the roll shaft.

2. A drive for a rolling mill having two roll shafts, a double helical gear on each roll shaft, a jack shaft having an axis of rotation out of the plane containing the axes of the roll shafts, a double helical driving gear on the jack shaft meshing with the gears on the roll shafts, the three gears being in the same plane, two driving gears on the jack shaft, one on each side of the first driving gear, a power shaft, and two gears on the power shaft meshing with the gears on the jack shaft, said driving shaft being located on the opposite side of the jack shaft from the roll shafts and having its axis lying in a plane including the axis of one of the roll shafts and the axis of the jack shaft.

In testimony whereof, I have hereunto set my hand.

JULIAN KENNEDY.